United States Patent Office 2,899,191
Patented Aug. 11, 1959

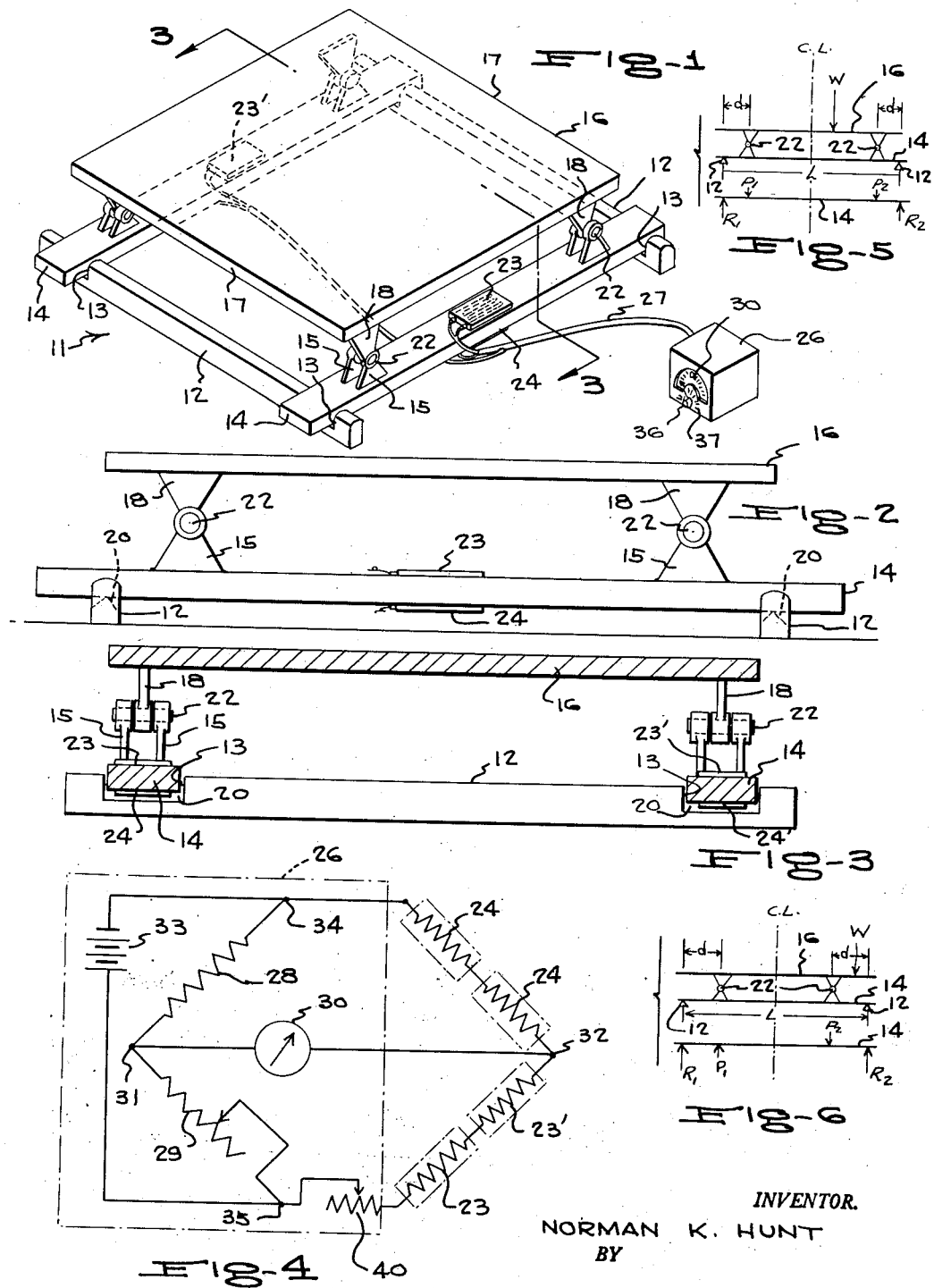

2,899,191

ELECTRICALLY ACTUATED WEIGHING DEVICE

Norman K. Hunt, Warren, Ariz.

Application April 12, 1957, Serial No. 652,517

5 Claims. (Cl. 265—27)

This invention relates to weighing scales, and more particularly to a weighing device of the type employing strain-responsive resistance elements as the active weight-indicating means thereof.

A main object of the invention is to provide a novel and improved weighing device of the electrically actuated type, said device being simple in construction, providing accurate indications regardless of the location of the object to be weighed on the receiving platform thereof, and being arranged so that it will maintain its accuracy over a long period of time without requiring replacement of any parts thereof or other substantial maintenance operations.

A further object of the invention is to provide an improved weighing device of the type employing strain-responsive resistance elements as the active weight-responsive means thereof, the weighing device involving relatively inexpensive components, being durable in construction, and employing a relatively simple and easily adjusted electrical circuit.

Further objects and advantages of the invention will become apparent from the following description and claims, and from the accompanying drawings, wherein:

Figure 1 is a perspective view of a weighing scale constructed in accordance with the present invention.

Figure 2 is a front elevational view of the weighing scale of Figure 1.

Figure 3 is a transverse vertical cross sectional view taken on the line 3—3 of Figure 1.

Figure 4 is a schematic diagram showing the electrical connections of the weighing scale of Figures 1 to 3.

Figure 5 is a diagram illustrating the static disposition of the forces applied to one side of the weighing scale of Figures 1 to 3 when a weight is applied on the receiving platform of the scale between the pin connections thereof.

Figure 6 is a diagram similar to Figure 5 but showing the distribution and direction of the forces applied to one side of the scale of Figures 1 to 3 when the weight is placed on the receiving platform of the scale outside one of the pin connections thereof.

Referring to the drawings, Figures 1, 2 and 3 illustrate a typical embodiment of a weighing scale according to the present invention, said scale being designated generally at 11. The scale 11 comprises a pair of transversely extending, spaced supporting bars 12, 12 which are suitably secured to an underlying supporting surface, for example, to a floor, so as to be rigidly fixed in parallel relationship and to extend vertically, as shown. The supporting bars 12, 12 are formed at their opposite end portions with respective rectangular notches 13 which are formed with the upwardly tapering fulcrum edges 20, as shown in Figures 2 and 3.

Designated at 14, 14 are a pair of first beam members which are of structural material having substantial elasticity and which are disposed in the notches 13 of the transverse supporting bars 12, 12, in the manner illustrated in Figure 1, so that the end portions of the beam members 14, 14 are supported on the fulcrum edges 20, 20 of the bars 12, 12. The beam members 14, 14 are thus arranged parallel to each other and perpendicular to the transverse supporting bars 12, 12.

Secured on each beam member 14 and spaced inwardly equal distances from the ends thereof, and from the fulcrum edges 20, 20 are respective pairs of upstanding pivot lugs 15, 15. Designated at 16 is a rectangular load-receiving platform defining a second beam member, and rigidly secured to the underside of the platform 16 and spaced inwardly from the side edges 17, 17 of the platform are the depending supporting lugs 18. The lugs 18 are spaced so as to be received between the respective pairs of upstanding pivot lugs 15, 15, and are pivotally connected to the lugs 15, 15 by respective hinge pins 22 which extend parallel to and are spaced equal distances from the respective fulcrum edges 20 at the opposite sides of the scale. Thus, the hinge pins 22 at the respective opposite sides of the scale are in alignment with each other along an axis parallel to the adjacent supporting bar 12 and spaced inwardly equal distances from the fulcrum edges 20.

Secured on the top and bottom surfaces of the beam members 14 midway between the fulcrum edges 20 are respective strain-responsive resistance units, shown at 23, 24 and 23', 24' the resistance units 23, 23' being mounted on the top surfaces of the beam members 14, 14 and the resistance units 24, 24' being mounted on the bottom surfaces of said beam members, midway between the fulcrum edges 20, 20.

It will be understood that the upper strain-resistance units 23, 23' respond to the compression developed in the upper fibers of the beam members 14, 14 when a load is applied to the platform 16, whereas the bottom strain-responsive resistance units 24, 24' respond to the tension developed in the lower fibers of the beam members 14, 14 as a result of the downward flexure of the beam members.

The strain-responsive resistance units 23 and 23' are electrically connected in series, and the strain-responsive bottom resistance units 24, 24' are likewise electrically connected in series. The series-connected resistance elements 23, 23' and 24, 24' are employed as opposite arms of a Wheatstone bridge circuit, the electrical components of the Wheatstone bridge circuit and the power supply therefor, except for the strain-responsive resistance units 23, 23' and 24, 24', being contained in a suitable cabinet 26, and the connecting wires for including the strain-responsive resistance units in the Wheatstone bridge circuit being incorporated in a suitble cable 27 extending from the cabinet 26 to the scale 11, as shown in Figure 1. The Wheatstone bridge circuit, shown schematically in Figure 4, comprises a fixed resistance arm 28, and a rheostat 29, comprising two arms of the bridge, and the series-connected strain-responsive resistance elements 23, 23' and 24, 24' comprising the remaining two arms of the bridge. The arm including the resistance units 23, 23' also contains a calibrating rheostat 40 to establish a proper zero reading on the ammeter 30 associated with the bridge. As shown, the ammeter is connected between a first junction point 31, being the common junction of the resistance 28 and the rheostat 29, and a second junction 32, being the common terminal of the resistance units 23' and 24, as shown in Figure 4. A battery 33 is connected between the opposing junction points 34 and 35 of the bridge, the junction point 34 being the common junction of the resistance 28 and the resistance unit 24', and the junction point 35 being the common junction of the rheostat 29 and the rheostat 40.

The rheostat 29 is provided with an operating knob 36 having a pointer which is located adjacent a suitable scale 37 on the cabinet 26, calibrated in units of weight. The zero position of the knob 36 may be such as to set rheostat 29 so that its resistance is equal to the opposite resistance arm 28 of the bridge.

The resistance units 24, 24' and 23, 23' are preferably identical, and when connected as shown in Figure 4 their resistance will be equal except for the fact that the device has dead weight which causes a certain amount of deflection of the beam members 14, 14. Therefore, with no load on the platform 16, the upper resistance units 23, 23' are subjected to the compression in the upper fibers of the beam members 14, 14 and the lower resistance units 24, 24' are subjected to the tension in the bottom fibers of the beam members, due to the dead weight of the apparatus. To compensate for the unbalance caused by the stresses in the top and bottom fibers of the beam members due to dead weight, the rheostat 40 may be adjusted to compensate for this preliminary stress condition, and may be set to provide a null-reading of the ammeter 30 with the indicating knob 36 set at the zero position on scale 37.

As will be readily apparent, since the upper resistance units 23, 23' are in compression, and the lower units 24, 24' are in tension, the resistance of the series-connected upper units 23, 23' will be normally less than the resistance of the series-connected lower units 24, 24', and this difference is compensated for by the adjustment of the calibration rheostat 40.

With the apparatus calibrated as above described, and with the knob 36 at its zero position on the scale 37, when a weight is placed on the platform 16, the force developed by said weight is transmitted through the pin connections 22 to the beam members 14, 14 and causes downward deflection of the beam members, resulting in compression of the top fibers of the beam members and tension of the bottom fibers thereof. Thus the resistance members 24, 24' are subjected to tension and the resistance members 23, 23' are subjected to compression, causing the bridge to become unbalanced and causing the needle of the ammeter 30 to swing away from its null position. The knob 36 may be then rotated to restore the ammeter 30 to its zero position. When so restored, the pointer of knob 36 will indicate the magnitude of the weight on the platform 16, the scale 37 being properly calibrated to provide this reading. Therefore any weight placed on the platform 16 will be indicated by the final position of the pointer of knob 36 when the ammeter 30 is restored to its null, or zero, position.

Obviously, instead of employing a manually adjustable rheostat 29 provided with a knob 36, a fixed resistor may be employed in this arm of the bridge and the scale of the ammeter 30 may be calibrated in units of weight, whereby the apparatus will be direct reading.

As will be now pointed out, the weight may be placed at any position on the platform 16 and regardless of such position, the apparatus will still provide a true reading of such weight.

Regardless of the longitudinal position of the load (the longitudinal direction being defined as the direction parallel to the supporting bars 12), the algebraic sum of the forces acting on the beams 14, 14 through the pin connections 22 will be the same. Since the beams 14, 14 are identical in dimensions and elastic characteristics and since the strain-responsive elements 23, 23' and 24, 24' (also identical) are connected as shown in Figure 4, the forces acting on the beams 14 are algebraically added in the Wheatstone bridge circuit, thus yielding the correct total load. (Algebraic sums are specified since the device is capable of weighing loads which are longitudinally placed outside the pin connections 22. Loads so placed would cause forces to act vertically upwardly on one end of each beam 14 and vertically downwardly on the other end of each beam 14.)

Regardless of the transverse position of the load (the transverse direction being defined as the direction perpendicular to the supporting bars 12), the same bending moment will be developed at the center line of each of the beams 14. Thus, in Figure 5, the weight is applied at a position located between the pin connections 22 of the platform 16. As shown, each beam 14 is supported by the fulcrum elements 20, 20. In the lower portion of Figure 5, the beam 14 is thus supported by reactions directed upwardly and shown at $R_1$ and $R_2$, corresponding to the locations of the fulcrum supports 20, 20. The forces applied to the beam 14 are designated at $P_1$, and $P_2$, and are downwardly directed at locations corresponding to the locations of the pin connections 22, 22, spaced inwardly equal distances from the points of application of the respective reaction forces $R_1$, $R_2$. It will be understood that the lower part of Figure 5 is a force diagram illustrating the distribution of the forces applied to a beam 14 resulting from the placement of a weight on the platform 16 in the position shown in Figure 5.

It can be shown readily that the bending moment at the center of the beam 14 in Figure 5, designated as M, is given by the expression $M = Wd$ divided by 2, where W is the portion of the load on the platform 16 which is applied to one of the beams 14 and $d$ is the horizontal distance between the respective supporting bars 12 and pin connections 22, as illustrated in Figure 5. Thus, assuming:

$M$ = bending moment at the center line of beam 14
$R_1$ = left end reaction on beam 14
$R_2$ = right end reaction on beam 14
$P_1$ = load transferred from platform 16 to beam 14 at left pin connection 22
$P_2$ = load transferred to beam 14 at right pin connection 22
$W$ = load applied to one of the beams 14
$L$ = distance between bars 12, 12
$d$ = horizontal distances between bars 12 and pin connections 22

Then $$W = P_1 + P_2 \text{ (from statics)}$$

$$M = \frac{R_1 L}{2} - \frac{P_1 L}{2} + P_1 d$$

but $$R_1 = \frac{(P_1 L - P_1 d + P_2 d)}{L}$$

$$M = \frac{P_1 L}{2} - \frac{P_1 d}{2} + \frac{P_2 d}{2} - \frac{P_1 L}{2} + P_1 d$$

$$M = \frac{(P_1 + P_2) d}{2}$$

but $P_1 + P_2 = W$

Therefore:

$$M = \frac{Wd}{2}$$

Assuming the set of conditions illustrated in Figure 6, wherein the weight is applied to the platform at a location outside the pin connections 22, 22, it can be again shown that the bending moment M is equal to W$d$ divided by 2. Thus, $$W = P_2 - P_1 \text{ (from statics)}$$

$$M = \frac{R_1 L}{2} + \frac{P_1 L}{2} - P_1 d$$

but $$R_1 = \frac{P_2 d - P_1 L + P_1 d}{L}$$

$$M = \frac{P_2 d}{2} - \frac{P_1 L}{2} + \frac{P_1 d}{2} + \frac{P_1 L}{2} - P_1 d$$

$$M = \frac{(P_2 - P_1)d}{2}$$

but $P_2 - P_1 = W$

Therefore $$M = \frac{Wd}{2}$$

It can also be shown, by force diagrams similar to Figures 5 and 6, that if the load is placed transversely, not only outside the pin connections 22, but also outside the fulcrum edges 20, the bending moment at the center line of the beam 14 remains constant.

Thus, it can be seen from the above statements and derivations that the sum of the bending moments at the center lines of the beams 14, 14 is directly proportional to the load on the receiving platform 16 and is independent of the position of the load on said receiving platform. Thus, it is clearly apparent that the unit strains in the outer fibers of the beams 14, 14 at the mid points thereof are directly proportional to the load on the receiving platform 16 regardless of the position of the load on said receiving platform.

It will be understood that Figures 1 to 3 merely illustrate one specific modification of the apparatus and that the device may be applied in any situation wherein it is desired to measure a load on the surface or platform regardless of its position or distribution thereon.

Although in the foregoing description, a Wheatstone bridge circuit has been disclosed as the specific resistance measuring instrument, any other type of resistance measuring instrument may be employed in the present invention, to respond to the tension and compression effects on the resistors 24, 24' and 23, 23', such as the resistance measuring instruments commonly employed as strain indicators in strain gages.

While a specific embodiment of an improved electrically operated weighing device has been disclosed in the foregoing description, it will be seen that various modifications within the spirit of the invention may occur to those skilled in the art. Therefore, it is intended that no limitations be placed on the invention except as defined by the scope of the appended claims.

What is claimed is:

1. In a weighing device of the character described, a pair of spaced supports, a first beam member disposed on said supports, said first beam member having flat horizontal top and bottom surfaces, a second beam member disposed over and spaced from the first beam member between said supports and substantially parallel to the first beam member, respective transversely extending pin connections between the beam members spaced inwardly of said supports and hingedly supporting said second beam member at longitudinally spaced points on said first beam member, respective strain-responsive resistance units secured on the flat top and bottom surfaces of the first beam member midway between said supports, a resistance measuring circuit, and means connecting said resistance units in said resistance measuring circuit, said circuit being formed and arranged whereby the response of said resistance units will provide an indication in said circuit in accordance with a load on said second beam member.

2. In a weighing device of the character described, a pair of spaced supports, a first beam member disposed on said supports, said first beam member having flat horizontal top and bottom surfaces, a second beam member disposed over and spaced from the first beam member between said supports and substantially parallel to the first beam member, respective transversely extending pin connections between the beam members spaced inwardly equal distances from said supports and hingedly supporting said second beam member on said first beam member, respective strain-responsive resistance units secured on the flat top and bottom surfaces of the first beam member midway between said supports, a resistance measuring circuit, and means connecting said resistance units in portions of said resistance measuring circuit, said circuit being formed and arranged whereby the response of said resistance units in said circuit will provide an indication in accordance with a load on said second beam member and the distance of the pin connections from said supports.

3. In a weighing device of the character described, a pair of spaced supports, a pair of parallel first beam members disposed on said supports, said beam members being arranged transverse to the supports, said first beam members having flat horizontal top and bottom surfaces, a platform member disposed over and spaced from the beam members inwardly of said supports, respective transversely extending pin connections between opposite marginal portions of the platform member and the beam members spaced inwardly equal distances from said supports and hingedly supporting said platform at longitudinally spaced points on said first beam members, respective strain-responsive resistance units secured on the flat top and bottom surfaces of the pair of first beam members midway between said supports, a resistance measuring circuit, means connecting the top resistance units in series, means connecting the bottom resistance units in series, and means connecting the respective series-connected resistance units in opposite portions of said resistance measuring circuit, said circuit being formed and arranged whereby the response of said resistance units in said circuit will provide an indication in accordance with a load on said platform member.

4. In a weighing device of the character described, a pair of spaced parallel supports, a pair of parallel first beam members disposed on said supports transversely thereto, said first beam members having flat horizontal top and bottom surfaces, a generally rectangular platform member defining a second beam member disposed over and spaced from the first beam members and having its side margins spaced inwardly from said supports and extending substantially parallel thereto, respective transversely extending pin connections between the side marginal portions of the platform member and the first beam members spaced inwardly equal distances from said supports and hingedly supporting said second beam members at longitudinally spaced points on said first beam members, respective strain-responsive resistance units secured on the flat top and bottom surfaces of the pair of first beam members midway between said supports, a resistance measuring circuit, means connecting the top resistance units in series, means connecting the bottom resistance units in series, and means connecting the respective series-connected resistance units in opposite portions of said resistance measuring circuit, said circuit being formed and arranged whereby the response of said resistance units in said circuit will provide an indication in said resistance measuring circuit in accordance with a load on said second beam member and the distance of the pin connections from said supports.

5. In a weighing device of the character described, a pair of spaced supports, a first beam member disposed on said supports, said first beam member having flat horizontal top and bottom surfaces, a load-receiving second beam member, means hingedly connecting said load-receiving member to said first beam member spaced inwardly equal distances from said supports, said second beam member being supported by said means above and in parallel spaced relation to said first beam member, respective strain-responsive resistance units secured on the flat top and bottom surfaces of said first beam member midway between said supports, a resistance measuring circuit, and means connecting said resistance units in opposite portions of said resistance measuring circuit, said circuit being formed and arranged whereby the response of said resistance units in said circuit will provide an indication in said measuring circuit in accordance with a load on said load-receiving second beam member.

References Cited in the file of this patent

UNITED STATES PATENTS

| | | |
|---|---|---|
| 2,213,982 | Frey et al. | Sept. 10, 1940 |
| 2,488,347 | Thurston | Nov. 15, 1949 |
| 2,499,033 | Oberholtzer | Feb. 28, 1950 |
| 2,597,751 | Ruge | May 20, 1952 |
| 2,681,566 | Ruge | June 22, 1954 |
| 2,786,669 | Safford et al. | Mar. 26, 1957 |

FOREIGN PATENTS

| | | |
|---|---|---|
| 942,273 | France | Sept. 13, 1948 |